(12) United States Patent
Townsend

(10) Patent No.: US 9,787,073 B1
(45) Date of Patent: Oct. 10, 2017

(54) ICF ELECTRICAL BOX

(71) Applicant: Richard Townsend, Barrington, NH (US)

(72) Inventor: Richard Townsend, Barrington, NH (US)

(*) Notice: Subject to any disclaimer, the term of this patent is extended or adjusted under 35 U.S.C. 154(b) by 0 days.

(21) Appl. No.: 15/453,404

(22) Filed: Mar. 8, 2017

Related U.S. Application Data

(60) Provisional application No. 62/428,114, filed on Nov. 30, 2016.

(51) Int. Cl.
*H02G 3/08* (2006.01)
*H02G 3/12* (2006.01)

(52) U.S. Cl.
CPC ............ *H02G 3/085* (2013.01); *H02G 3/121* (2013.01)

(58) Field of Classification Search
USPC ...................................... 174/50, 58
See application file for complete search history.

(56) References Cited

U.S. PATENT DOCUMENTS

| 3,622,029 | A | 11/1971 | Ware | |
|---|---|---|---|---|
| 3,955,701 | A | 5/1976 | Fisch | |
| 6,891,104 | B2 * | 5/2005 | Dinh | H02G 3/14 174/375 |
| 7,429,700 | B2 * | 9/2008 | Kanamaru | H01R 13/506 174/135 |
| 8,253,016 | B1 * | 8/2012 | Baldwin | H02G 3/081 174/50 |
| 8,927,860 | B2 * | 1/2015 | Yamamoto | H02G 3/22 174/50 |
| 9,667,053 | B2 * | 5/2017 | Wurms | H02G 3/383 |

* cited by examiner

*Primary Examiner* — Dhirubhai R Patel

(57) ABSTRACT

An improved electrical box for use with ICF foam block walls, or the like, and having two main components, namely, a female component which is open at a front end thereof and closed at a rear end thereof and is sized and shaped to receive a male component which is opened at both a trailing front end and a leading rear end thereof. The female and male components having knockouts to accommodate conduit. The male and female components having flanges and mating locking mechanisms to retain the improved electrical box in position on the ICF foam block wall until removal with the use of a removal tool.

18 Claims, 14 Drawing Sheets

FIG. 15A
FIG. 15B
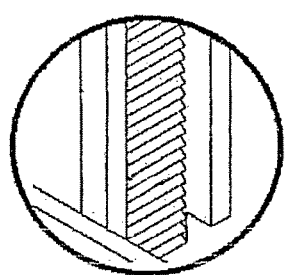
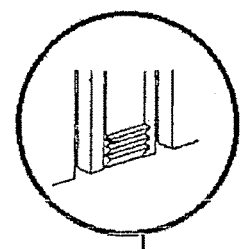
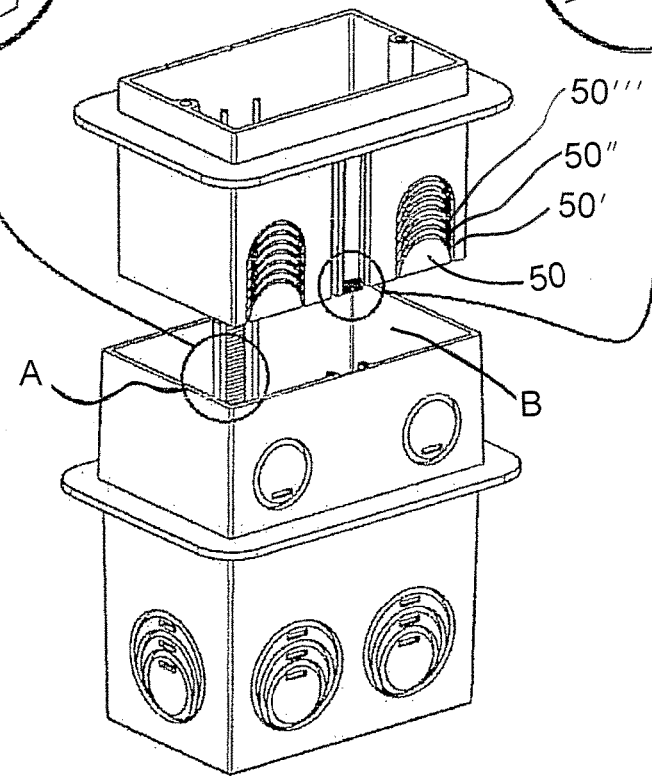
FIG. 15

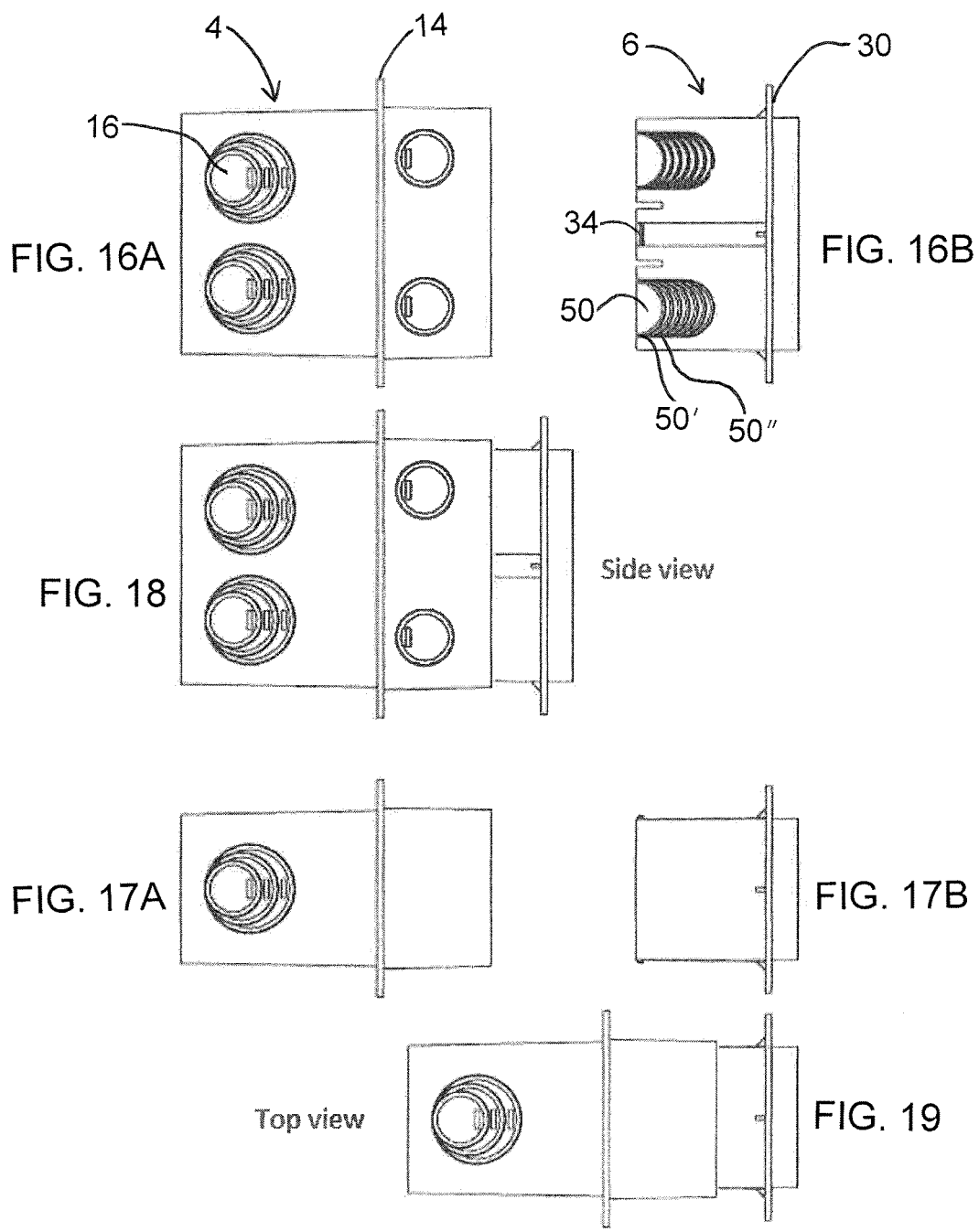

Face Ring

3-D Assembled view
from installation

A. Set ICF blocks
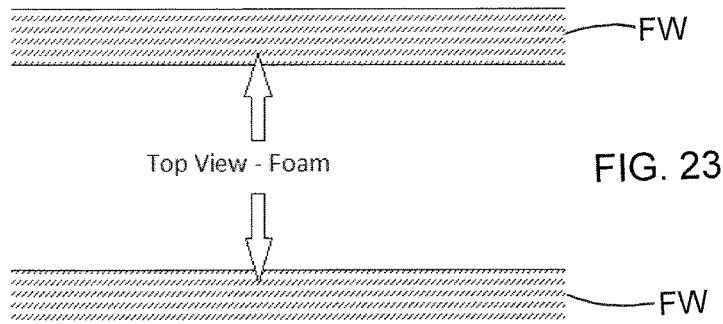
FIG. 23
B. Cut hole for Box
FIG. 24
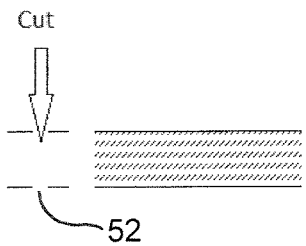
FIG. 25
C. Insert Box with Male conduit adapters
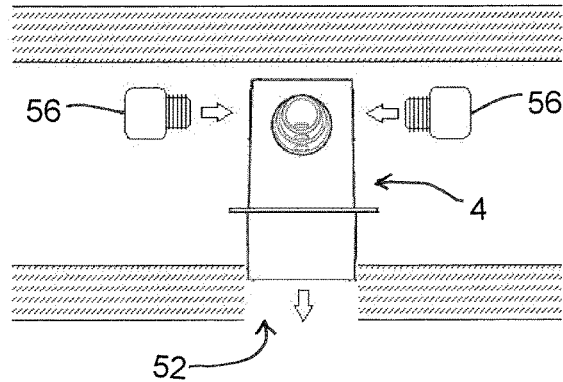

ICF ELECTRICAL BOX

CROSS REFERENCE TO RELATED APPLICATION

This application claims priority from U.S. Provisional Application Ser. No. 62/428,114, filed Nov. 30, 2016 and the disclosure of that application is incorporated herein by reference in its entirety.

FIELD OF THE INVENTION

The present invention relates to electrical boxes for installing switches, electrical plugs, outlets and other electrical accessories flush with a wall surface, and more particularly relates to an improved electrical box and method of mounting the same with less labor and lower material costs while minimizing the damage or disfiguration to the aesthetic appearance of the finished wall and to enable compliance with codes.

BACKGROUND OF THE INVENTION

In the electrical trades, it is frequently required to expand existing electrical box configurations to meet new construction material requirements and methodologies, and at the same time, conform to existing governing codes. With the current commercially available electrical boxes, this is a costly and time consuming task.

Electrical junction boxes are used in building construction and are conventionally installed on the stud walls of a space in a building under construction. Typically, the electrical junction boxes are designed to allow electrical power wires passing through the walls to connect with a structure mounted in or on a wall. For example, electrical junction boxes are designed to provide a rigid and stationary housing for electrical junctions such as where electrical receptacles and switches are connected to electrical wires and where there is normally some uninsulated or dangerous circuit wiring at the exposed connections.

The National Electrical Code, NEC 314.16(b), provides an electrical box volume allowance requirement per conductor. For example, 12 American wire gauge (AWG) wiring requires 2.25 cubic inch per conductor and 14 AWG wiring requires 2.0 cubic inch per conductor. There are commonly 3 conductors per wire and 3 wires per electrical box. Thus, a conventional 12 AWG box would require 20.25 ci and a conventional 14 AWG box would require 18 ci.

One of the earliest patents for an insulated stay-in-place formwork for concrete was registered in the early 1940s. The first ICF forms were developed in the late 1960s. ICF construction had steadily increased since the 1970s though it was initially hampered by lack of awareness, building codes, and confusion caused by many different manufacturers selling slightly different designs rather than focusing on industry standardization.

According to the U.S. Department of Housing and Urban Development, Office of Policy Development and Research, ICF construction costs 3% to 5% more than conventional construction. In some cases, experienced contractors report that electrical costs are on average $3.50 per square foot for conventional wiring and about $4.50 per square foot for ICF construction. ICF type construction is considered better around the world since energy conservation is of global concern. ICF was introduced over 50 years ago and identified as a substantial benefit to the planet yet presently it costs more.

To meet current building codes, there have been adaptations to increase the electrical box volume. One such example is a telescopic electrical box, in U.S. Pat. No. 3,622,029, that extends the box to the side to increase the number of wires that can fit within a smaller finish box. In another, a Universal extension expands the depth of the metal box. See, U.S. Pat. No. 3,955,701. However, the state of the art does not resolve the problem of the removal of ICF foam material or extend into the concrete or provide for a self-adjusting and locking 2-part compressing electrical box, as described herein, nor does it address additional issues caused by ICF building requirements.

ICF wall foam limits the depth possible for electrical boxes. For example, when a box is installed in 2.625 inch thick foam with a mud ring, a net 18 ci is available for the box. This volume does not allow for more than three 14-AWG wires or two 12-AWG wires. In contrast, in this single box example, the ICF electrical box of the present disclosure nets 36 ci, allowing for five 12-AWG or six 14-AWG.

Most current electrical box installations in ICF walls are not conforming to size because they are limited to the thickness of the foam they are mounted in, after the concrete is installed. Additionally, wires pass through site-cut channels through the foam insulation which must be refilled with liquid foam then trimmed after the foam dries.

Most electrical boxes are installed by electricians, after the ICF walls are erected and filled with concrete. The alternative to securing wires, in accordance with NEC 300.4, without substantial effort to attach the wires to the concrete, is to use electrical conduit or metallic-shielded wire. Metallic-shielded wire costs far more than polyvinyl chloride (PVC) conduit and electrical metallic tubes (EMT), and is not permitted to be used in poured concrete applications. EMT fittings cost even more than PVC.

Another method of wiring is to use an electrical box that is contained within the foam and then attached to conduit that sweeps into the concrete. ICF builders often use traditional electrical boxes that will fit into the depth of the ICF foam or similar electrical boxes with grips that extend into the sides of the foam. These boxes are still limited to the depth of the foam and leave an unprofessional appearance due to the array of necessary site-cut channels which need to be covered by the finish wall, such as sheet rock.

Current standards are such that boxes cannot always conform with regulations without extensive alterations to conform to the desired use in ICF applications. As used herein, "ICF" or "foam", includes, but is not limited to, a surface, material, wall, partition, etc., for which this invention may be applied as it is anticipated that other building materials may be developed which could benefit from the improved electrical boxes described herein.

Currently, a substantial time investment, expense, and job completion delays are common due to the wait for an electrical contractor after the walls are complete. Most electrical boxes cannot be installed before the wall is finished due to the weight of wet concrete pushing them out; and the conventional boxes do not extend beyond the foam into the concrete. Metallic-shielded wire can be used within the ICF foam yet costs more for material and labor and leaves an unprofessional appearance and a mess to clean up as well as a need to refill the foam and then cut the hardened foam once dried. Additionally, current electrical boxes are not easily attachable to the foam, they do not extend into the concrete, nor could these traditional boxes sustain the weight of concrete in their current design or conform to building code.

SUMMARY OF THE INVENTION

Wherefore, it is an object of the present invention to overcome the above mentioned shortcomings and drawbacks associated with the prior art electrical boxes and installation techniques.

The invention is particularly suited for the use with modern Insulated Concrete Forms, hereafter referred as "ICF". ICF constructed walls are concrete filled foam forms that replace studs and insulation filled cavities within walls, thereby removing the traditional means of attaching electrical boxes, electrical switches, and other accessories and connect them through the walls with wire. This invention utilizes relatively deep electrical boxes that are designed to withstand the pressure of wet poured concrete. Additionally, the electrical boxes are easier to install, cleaner, more professional, environmentally friendly, and can be installed by lower cost, unlicensed labor thereby reducing the overall wiring cost of a building.

The present invention also relates to an improved electrical box comprising: a female component being open at a front end thereof, and an exterior surface of female component supporting a female flange; a male component being open at at least a front end thereof, and an exterior surface of the male component supporting a male flange; a first member of a locking mechanism being supported by the female component and a mating second member of the locking mechanism being supported by the male component; and during assembly of the improved electrical box, the male component being received within the open end of the female component and the locking mechanism facilitating relative receiving movement of the male component within the female component until the male flange and the female flange sandwich a foam wall therebetween, and the locking mechanism facilitates retaining a relative position of the male and the female components such that the foam wall is captively retained between the male and the female flanges.

The present invention also relates to an improved electrical box in combination with at least one ICF foam block with a through hole cut through a foam wall of the ICF foam block, the improved electrical box comprising: a female component being open at a front end thereof, and an exterior surface of female component supporting a female flange; a male component being open at at least a front end thereof, and an exterior surface of the male component supporting a male flange; a first member of a locking mechanism being supported by the female component and a mating second member of the locking mechanism being supported by the male component; and during assembly of the improved electrical box within the through hole cut through the foam wall of the ICF foam block, the male component being received within the open end of the female component and the locking mechanism facilitating relative receiving movement of the male component within the female component until the male flange and the female flange sandwich the foam wall of the ICF foam block therebetween, and the locking mechanism facilitates retaining a relative position of the male and the female components such that the foam wall is captively retained between the male and the female flanges.

In the practice of the present invention for wiring new ICF buildings, this 2-part ICF electrical box is a device that uses consecutive grooves and teeth to self-adjust and lock itself tight to the ICF wall without additional fasteners and compresses embedding stabilizing components into the foam to eliminate twisting under extreme conditions. Embodiments of the electrical box of the present invention provide needed conformity to NEC and other code's wire-quantity and securing-requirements, and conform to all standards. In some cases, the electrical boxes of the present invention provide additional security against construction worker error by incorporating conventional features (e.g. knockouts), in addition to other proprietary features. Certain electrical boxes of the present invention universally fit all ICF applications and allow anyone, with or without a license, to install the boxes at a substantial time and financial savings. In some embodiments, the boxes permit no less than five 12-AWG or six 14-AWG 3-conductor wires and simplify the installation to encourage the use of PVC conduit within concrete by reducing the cost of materials and labor associated with the various factors that must be considered.

Some principle objects of the present invention are to: enable more than enough wire feeds to provide flexibility and scalability; encourage more secure methods of installing wires at lower cost; enable installation of electrical boxes during wall construction by a less skilled workforce; provide added security of the box during the pouring of concrete; eliminate cutting and filling of foam insulation in order to run wires; reduce waste and cleanup; and provide a more professional appearance.

A significant reduction in the time needed to install the electrical boxes during ICF construction can be achieved by using unskilled labor instead of an experienced electrician. This invention accommodates other methods of wiring as an option, such as in the event of human error, including, but not limited to inadvertently omitting a desired conduit. Ultimately, supported by the historic values, this invention is expected to contribute to making a global improvement in cost and energy savings in the building industry that hinges on reducing the cost of energy-conservative products.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which:

FIG. 15 is a diagrammatic front perspective view showing alignment of the male component relative to the female component during assembly of the male and female components with one another according to one embodiment of the improved electrical box of the present invention;

FIG. 15A is an enlargement of area A of FIG. 15;

FIG. 15B is an enlargement of area B of FIG. 15;

FIG. 16A and FIG. 16B is a diagrammatic side elevational view showing alignment of the male component relative to the female component during assembly;

FIG. 17A and FIG. 17B is a diagrammatic end elevational view showing alignment of the male component relative to the female component during assembly;

FIG. 18 is a diagrammatic side elevational view showing engagement of the male component with the female component following mating engagement of the male component with the female component;

FIG. 19 is a diagrammatic end elevational view showing engagement of the male component with the female component following mating engagement of the male component with the female component;

FIG. 23 is a diagrammatic top plan view showing the empty void between two side foam walls which form the ICF foam block;

FIG. 24 is a diagrammatic top plan view showing a through hole cut completely through one of the two foam side walls of an ICF foam block for accommodating an improved electrical box, according to the present disclosure;

FIG. 25 is a diagrammatic top plan view of the ICF foam block showing the front of the female component partially engaged with the through hole extending completely through one of the two foam side walls of the ICF foam block;

Figure 1:
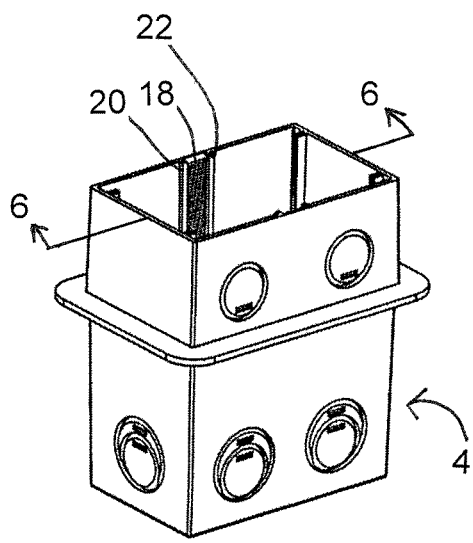
FIG. 1 is a diagrammatic front perspective view of the female component of the improved electrical box according to the principles of the present invention.
Figure 2:
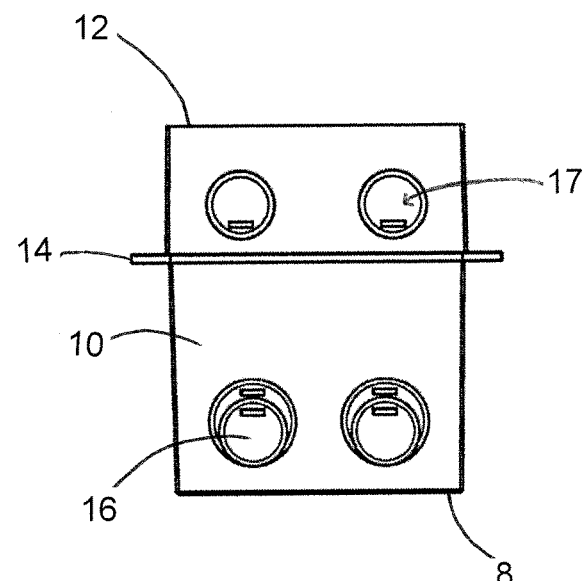
FIG. 2 is a diagrammatic side elevational view of the female component of the improved electrical box according to the principles of the present invention as shown in FIG. 1.
Figure 3:
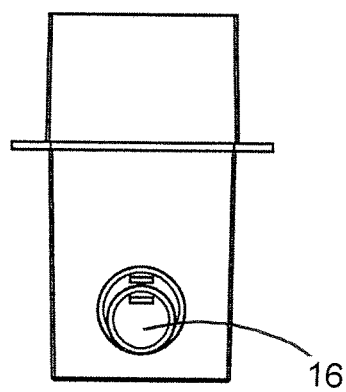
FIG. 3 is a diagrammatic end view of the female component of the improved electrical box according to the principles of the present invention as shown in FIG. 1.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE
PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Turning first FIG. 15, a brief description concerning the various components of improved electrical box 2, according to the present invention, will be briefly discussed. This will then be followed by a discussion relating to assembly and use of the improved electrical box 2.

The improved electrical box 2 generally comprises two main components, namely, a female component 4 (shown in FIGS. 1-7) which is open at a front end thereof and closed at a rear end thereof and is sized and shaped to receive a male component 6 (shown in FIGS. 8-14), which is opened at both a trailing front end and a leading rear end thereof. A detailed discussion concerning the female component 4 will be first provided and this discussion will then be followed by a detailed discussion of the male component 6.

As can be seen in FIGS. 1-7, the female component 4 generally comprises a closed rear wall 8 as well is four solid and interconnected sidewalls 10, e.g., a pair of opposed spaced apart first sidewalls and a pair of opposed spaced apart second sidewalls. As noted above, the female component 4 is open at the front end 12 thereof which facilitates receiving a leading rear section of the male component 6, as will be discussed below in further detail. One embodiment of the female component 4 may, for example, have a length of between about 4.5 inches and about 5.5 inches. In one embodiment, the female component may, for example, have a height of between about 3.75 inches and about 4.0 inches. In certain embodiments, the height may be about 3⅞ inches. In one embodiment, the female component 4 may have a width of about 2.3 inches. In another embodiment, the female component 4 may have a width of about 4.0 inches. In another embodiment, the female component 4 may have a width of about 5.5 inches. Depending on the desired application, dimensions can vary can vary from application to application, without departing from the spirit and scope of the invention. The dimensions listed above do not include the extent that the female flange protrudes from the sidewalls.

A female flange 14 extends around the entire periphery or perimeter of the exterior sidewall 10 of the female component 4, adjacent to but spaced from the open front edge 12 of the female component 4. The female flange 14 is typically spaced from the open front edge 12 of the female component 4 by a distance or a length which is less than the thickness of a foam wall FW of an ICF foam block B. For example, the female flange 14 may be spaced from the front end 12 of the female component 4 between 0.5 inches and about 2.5 inches. It is to be appreciated that the female flange 14 must have a sufficient height as well as have a sufficient wall thickness or rigidity in order to securely engage with an inwardly facing surface of the ICF foam block B in a locking manner as described below, the purpose of which will become apparent from the following description.

Figure 4:
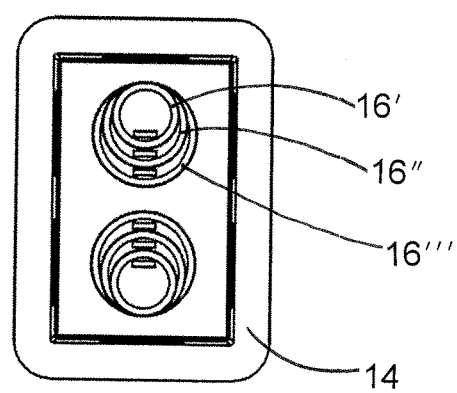
FIG. 4 is a diagrammatic rear plan view of the female component of the improved electrical box according to the principles of the present invention as shown in FIG. 1.
Figures 5, 6:
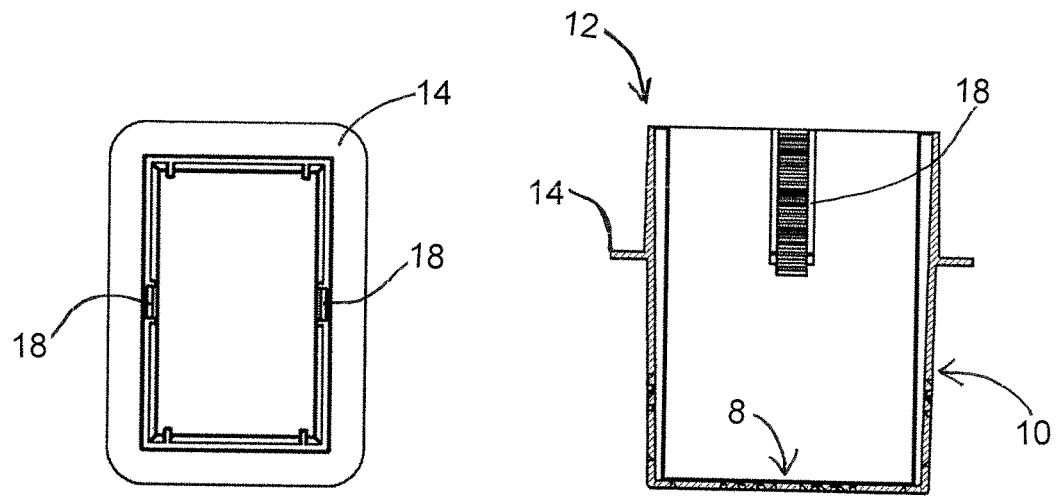
FIG. 5 is a diagrammatic front plan view of the female component of the improved electrical box according to the principles of the present invention as shown in FIG. 1.
FIG. 6 is a diagrammatic cross sectional view along section line 6-6 of FIG. 1.
Figure 7:
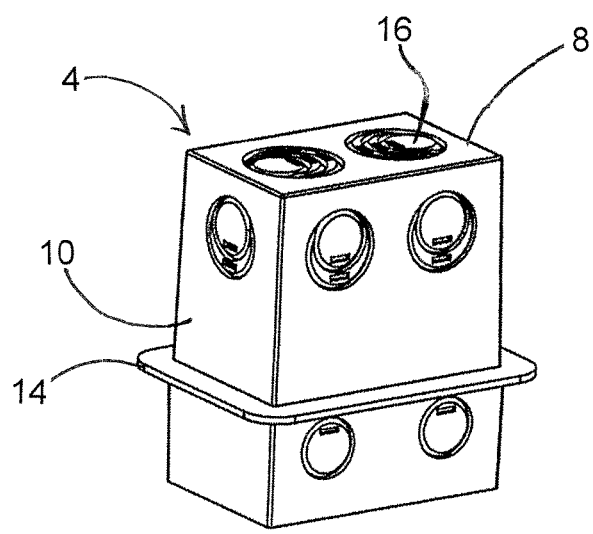
FIG. 7 is a diagrammatic rear perspective view of the female component of the improved electrical box according to the principles of the present invention as shown in FIG. 1.

As generally shown, the rear wall 8 of the female component 4 typically has at least one knockout 16, 17 e.g., two spaced apart conventional knockouts 16 are shown in FIGS. 4 and 7, while each of the four side walls typically at least one knockout 16. For example, one conventional knockout 16 is shown in the first sidewall (see FIG. 3) while a plurality of spaced apart conventional knockouts 16 are shown in the second sidewall (see FIG. 2). That is, a first pair of conventional knockouts 16 are provided in the second sidewall on one side of the female flange 14 and adjacent the closed rear while a second pair of conventional knockouts 17 are provided in the second sidewall on an opposite side of the female flange 14 and adjacent the open front of the female component 4.

As generally shown, each knockout 16 typically has three different size knockout sections 16', 16" and 16''' that can be removed, by a user from a remainder of the female component 4, depending upon the size of the conduit 58 to be connected to the female component 4. That is, when the user is connecting a smaller conduit 58 to the female component 4, the user "knocks out" or removes the smaller diameter knockout section 16', when the user is connecting an intermediate size conduit 58 to the female component 4, the user "knocks out" or removes both the smaller and the middle diameter knockout sections 16' and 16", and when the user is connecting a large conduit 58 to the female component 4, the user "knocks out" or removes the smaller, the middle and the larger diameter knockout sections 16', 16" and 16''' in order to provide access to the interior compartment defined by the female component 4. It is to be appreciated that the number of knockouts 16 and knockout sections 16', 16" and 16''', as well as the size and location of the each knockout 16, can vary, from application to application, without departing from the spirit and scope of the invention. The important aspect is that the female component 4 has one or more removal knockouts 16 which facilitate coupling conduit 58 to the female component 4.

The female component 4 typically has a sidewall thickness of about 0.079 inches (2 mm). Each knockout 16 and/or knockout section 16', 16" and 16''' is typically defined by of a thinned area, groove, or recess formed in the rear wall 8 or the sidewall 10 of the female component 4 which facilitates removal of a desired knockout section 16', 16" and 16''' of the female component 4. As shown, the thinned areas, grooves or recesses are in the shape of circles which respectively define either the small, the intermediate, or the large knockout sections 16', 16" and 16'''. The thinned area, groove, or recess typically has a depth of about 0.067 inches (1¾ mm) thereby only leaving a remaining wall thickness of about 0.01 inches (¼ mm). Such thin remaining wall thickness facilitates relatively easy removal of the desired knockout section or sections 16', 16" and 16''' from a remainder of the female component 4. It is to be appreciated that the thickness of the female component 4 as well as the depth of the thinned areas, grooves or recesses defining the respective knockouts 16 can vary, from application to application, without departing from the spirit and scope of the invention.

As shown in FIGS. 1, 6, 15A and 15C, each of the opposed interior side walls of the first pair of sidewalls 10 of the female component 4 supports a plurality of aligned and equally spaced apart teeth 18 that extend between a first lateral rail 20 and an opposed second lateral rail 22. As shown in those Figures, the plurality of aligned and equally spaced apart teeth 18 extend from the open front end toward the close rear wall 8 of the female component 4 but typically are only provided part way toward the closed rear wall 8. That is, spaced apart teeth 18 and the first and the second lateral rails 20, 22 typically only extend about half the distance to the closed rear wall 8 of the female component 4. The plurality of equally spaced apart teeth 18 are each generally triangular in shape with one surface, i.e., a normal surface, extending substantially normal to the sidewall 10 of the female component 4 and typically have a height of about ⅛ inch and width of about 10 mm. It is understood that the teeth can be any depth (in some cases about ⅛ inch), but the height in one application comprised nominal ⅛" increments. However, a tolerance may allow this to sandwich with about a +0.0125 inch tolerance to compensate for material deflection, so that in some embodiments there may be a minor looseness instead of having to advance to the next tooth which may result in approximately a 1/8" looseness.

It is to be appreciated that the pair of opposed first and/or second sidewalls 10 may also support one or more guide(s), slot(s), channel(s), rib(s), etc., or other guide feature(s) (not shown in detail) which interact with mating or corresponding guide(s), slot(s), channel(s), rib(s), etc., or other mating guide feature(s) of the male component 6 (not shown in detail), to facilitate guided axial movement of the male component 6 relative to the female component 4, as will be discussed in further detail below.

As can be seen in FIGS. 8-14, the male component 6 generally comprises both a leading open rear end 24 as well as a trailing open front end 26. The open leading rear 24 and open front end 26 are separated from one another by four solid and interconnected sidewalls 28, e.g., a first pair of opposed spaced apart sidewalls and a second pair of opposed spaced apart sidewalls. The open front end 24 of the male component 6 facilitates receiving and supporting of a conventional electrical device D (not shown), in a conventional manner, while the open rear end 26 facilitates connection of the conventional electrical device D to conventional electrical wires W (not shown), which can be accommodated in the female component 4, as will be discussed below and further detailed. One embodiment for the male component 6 may, for example, have a length of between about 1.5 inches and about 3.0 inches. In some cases, the length of the male component 6 may be about 2.125 inches. In one embodiment of the male component 6, the height may be about 3.5 inches and about 4.0 inches. In some cases, the male component 6 may have a height of about 2.610 inches. In one embodiment, the male component 6 may have a width of about 2.0 inches. In another embodiment, the male component 6 may have a width of about 3.5 inches. In another embodiment, the male component 6 may have a width of about 5.0 inches. In some cases, the first embodiment is about 2.2 inches, the second embodiment is about 3.3 inches and the third embodiment is about 4.8 inches wide. Depending on the desired application, dimensions can vary can vary from application to application, without departing from the spirit and scope of the invention. The dimensions listed above do not include the extent that the male flange protrudes from the sidewalls.

A male flange 30 extends around the entire periphery or perimeter of the male component 6, typically closely adjacent the open front end 26 of the male component 6. The male flange 30 is typically spaced from a front edge of the male component 6 by about 3/8±1/4 inch. It is to be appreciated that the male flange 30 must have a sufficient height as well as have sufficient wall thickness or rigidity in order to securely engage with an outwardly facing surface of the foam wall FW of an ICF foam block B in a locking manner as described below, the purpose of which will become apparent from the following description.

A pair of opposed exterior outwardly facing sidewalls 32 of the male component 6 has at least one locking tooth 34, or possibly two or more space apart locking teeth (e.g., three locking teeth 34 are shown in FIGS. 15 and 15B). If two or more locking teeth 34 are provided, the spacing of the each of locking tooth 34 is equal to the spacing of the plurality of aligned and equally spaced apart teeth 18 of the female component 4 to facilitate locking engagement therewith. The at least one locking tooth 34 is located and extends between a pair of parallel spaced apart first and second slots 36, 38 which are spaced from one another so as to receive and engage with the pair of lateral rails 20, 22 of the female component 4. Each one of the locking teeth 34 typically has a triangular cross sectional shape with one surface thereof extending substantially normal to the sidewall of the male component 6. Each locking tooth 34 typically has a height of about 1/8 inch and a width of about 8 mm, but can vary. The at least one locking tooth 34 is sized and shaped to matingly engage with one of the equally spaced apart teeth 18, that extend between the first lateral rail 20 and the second opposed lateral rail 22, while the pair of slots 36, 38 are located to receive and engage with a respective one of the first and the second lateral rails 20, 22.

Figure 15C:
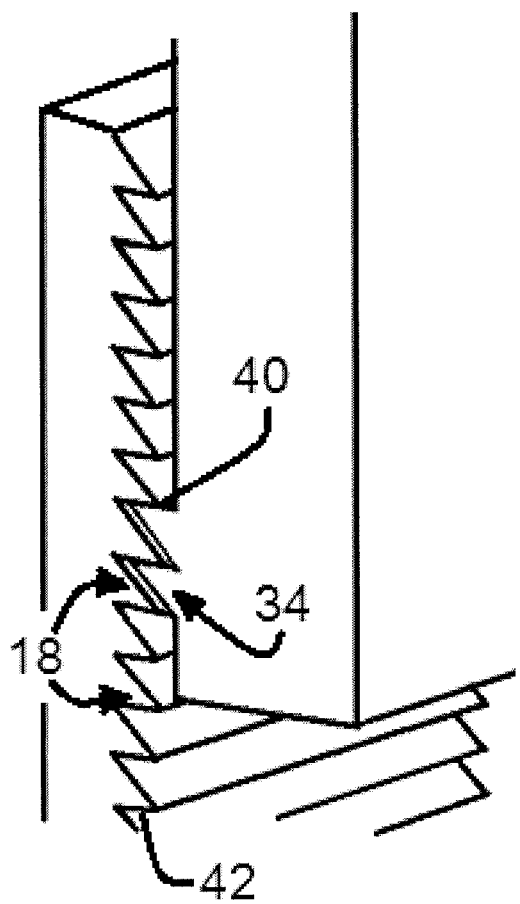
FIG. 15C is a diagrammatic cross section showing the at least one tooth of the male component engaging with a select tooth of the plurality of equally spaced teeth of the female component according to the principles of the present invention.

Referring to FIG. 15C, the substantially normal surface 40 of the locking tooth/teeth 34 of the male component 6 mating engage(s) with a substantially normal surface 42 of one of the plurality of aligned and equally spaced apart teeth 18 of the female component 4 to secured the relative positions of the male and female components 4, 6 with respect to one another. The at least one locking tooth 34 of the female component 4 and the equally spaced apart teeth 18 of the male component 6 are all sized and shaped to permit the male component 6 only to be incrementally inserted further, tooth by tooth, into the female component 4 but prevent relative movement in the opposite direction which would permit withdrawal of the male component 6 from the female component 4.

In the event that removal of the male component 6 is desired from the female component 4, a specially designed tool 44 (discussed below) is required to disengage the at least one locking tooth/teeth 34 of the male component 6 from the spaced apart teeth 18 of the female component 4.

In addition, the exterior second pair of opposed sidewalls 28 of the male component 6 may support one or more corresponding guide(s), slot(s), channel(s), rib(s), etc., or other guide feature(s) which interact with mating or corresponding guide(s), slot(s), channel(s), rib(s), etc., or other guide feature(s) of the female component 4 to facilitate guided axial movement of the male component 6 relative to the female component 4.

A column 46 extends along an inwardly facing central region of each of the opposed first sidewalls 28 of the male component 6, closely adjacent the open front end 26. A threadable bore 48 extends through this column 46 and the threadable bore 48 facilitates secure attachment of a desired electrical device, an electrically outlet, an electrical switch, etc., to the male component 6 in a conventional manner via a pair of conventional fastening screws (not shown). As the purpose and function of the threadable bores 48 are conventional and well known in the art, a further detailed discussion concerning the same is not provided. In some cases, the material in the threadable bore is soft enough to be "self-threaded." In other cases, it may be pre-threaded.

Figure 8:
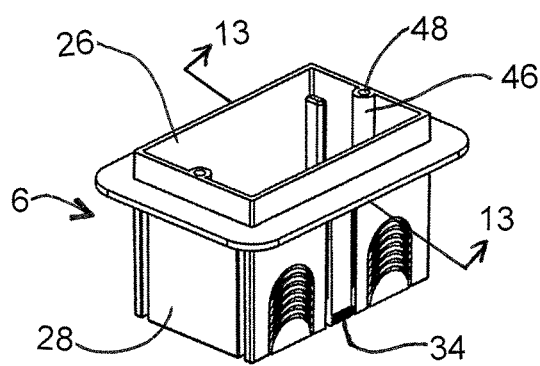
FIG. 8 is a diagrammatic front perspective view of the male component of the improved electrical box according to the principles of the present invention.
Figure 9:
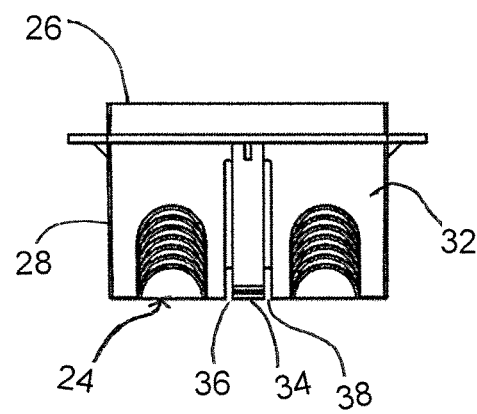
FIG. 9 is a diagrammatic side elevational view of the male component of the improved electrical box according to the principles of the present invention as shown in FIG. 8.
Figure 10:
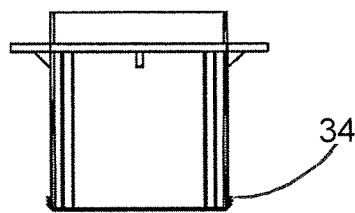
FIG. 10 is a diagrammatic end view of the male component of the improved electrical box according to the principles of the present invention as shown in FIG. 8.
Figure 11:
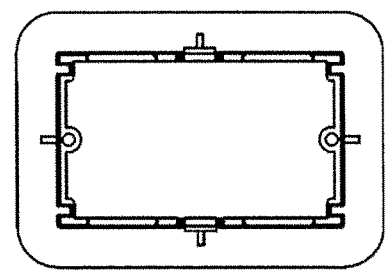
FIG. 11 is a diagrammatic rear plan view of the male component of the improved electrical box according to the principles of the present invention as shown in FIG. 8.
Figure 12:
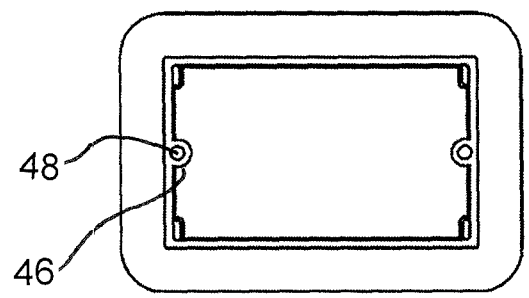
FIG. 12 is a diagrammatic front plan view of the male component of the improved electrical box according to the principles of the present invention as shown in FIG. 8.
Figure 13:
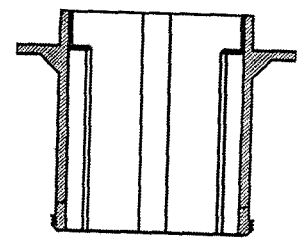
FIG. 13 is a diagrammatic cross sectional view along section line 13-13 of FIG. 8.
Figure 14:
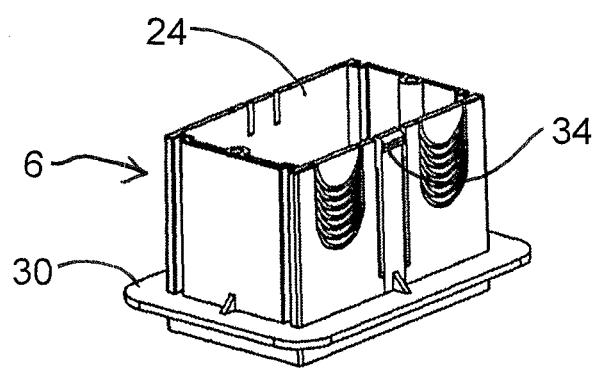
FIG. 14 is a diagrammatic rear perspective view of the male component of the improved electrical box according to the principles of the present invention as shown in FIG. 8.

As generally shown in FIGS. 8, 9 and 14, each of the second opposed sidewalls 28 of the male component 6 supports a pair of gradient knockouts 50. Each one of gradient knockout comprises a series of gradient knockout sections 50', 50", 50''' . . . , which are defined by a thinned area, groove or recess which has a depth of about 0.067 inches (1¾ mm) thereby leaving a remaining wall thickness of about 0.01 inches (¼ mm). Each one of the gradient knockout sections 50', 50", 50''' . . . generally has an arcuate or semicircular shape. The male component 6 typically has a depth of about 0.079 inches (2 mm). It is to be appreciated that the thickness of the male component 6 as well as the depth of the respective thinned area, groove, or recess, defining each gradient knockout or knockout section can vary, from application to application, without departing from the spirit and scope of the invention. The function and purpose of the gradient knockouts 50 will be discussed below.

Figure 29:
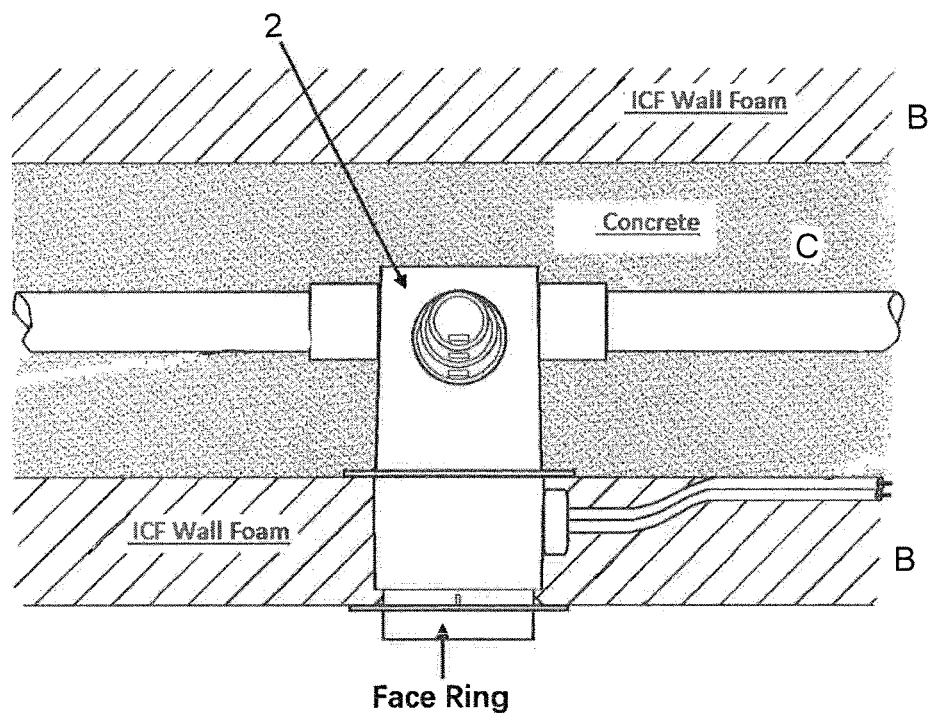
FIG. 29 a diagrammatic top plan view of the assembled male and female components and the conduits after the concrete is poured, similar to FIG. 28, showing a slight modification of the disclosure.
Figure 20:
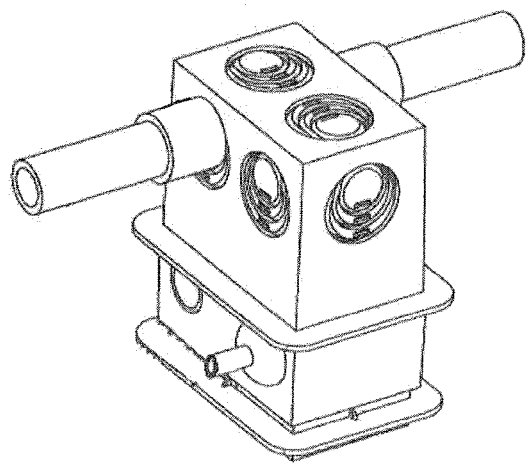
FIG. 20 is a diagrammatic assembly perspective, demonstrating mating engagement of the female component with the male component, with two conduits attached to and extending from the female component and alternative wiring as can be applied within the ICF foam.
Figure 22:
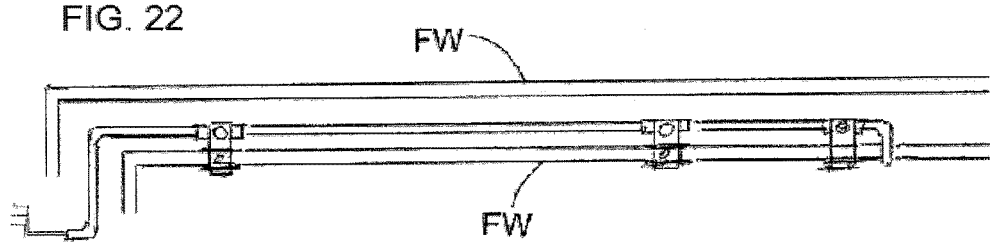
FIG. 22 is a diagrammatic top plan view of FIG. 21 showing the conduits interconnecting the plurality of electrical components with one another.

As shown, a portion of the gradient knockout 50 is coincident with the rear of the male component 6. During installation, a user can remove one or more of the gradient knockout sections 50', 50", 50''' . . . to provide access through the sidewall 28 of the male component 6. The number of gradient knockout sections 50', 50", 50''' . . . which are removed from the male component 6 by the user, provide alignment with the single knockouts on female part 4 to accommodate various thickness of ICF wall material, in the event alternative wiring 69 (as seen, for example, in FIG. 27) is required. The gradient knockouts 50 in the male component 6, between the male flange 30 and the front end 26 of the male component 6, as well as the knockout(s) 16 provided in the female component 4, between the female flange 14 and the front end of the female component 4, are typically removed in order to "run" electrical wiring once the concrete C is poured into the interior compartment of the ICF foam block B, as generally shown in FIG. 29.

Turning now to FIGS. 21-29, a detailed description concerning assembly of the improved electrical box 2, according to the present invention, with an ICF foam block B will now be described.

Figure 21:
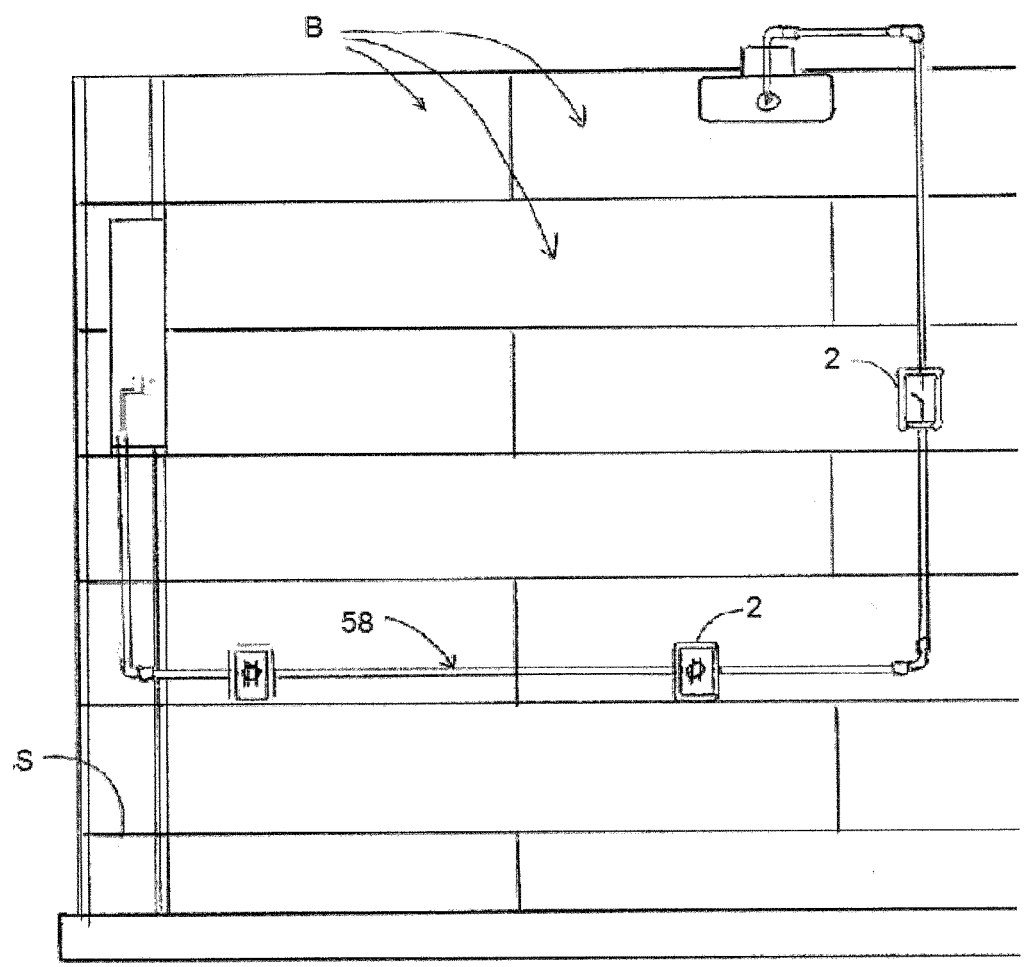
FIG. 21 is a diagrammatic front elevational view showing assembly of a plurality of ICF foam blocks with one another to form a wall with a plurality of electrical components being supported by the wall at various locations.

As generally shown in FIG. 21, each ICF foam block B normally has a length of between 2 feet and 10 feet (typically a length of about 8 feet), a height of between 12 inches and 24 inches (typically a height of either 16 inches or 18 inches), and a width (e.g., measured from the outwardly facing surface of the first foam wall FW to the outwardly facing surface of the second foam wall FW) which is typically between about 8 inches and about 17 inches. In addition, each one of the first and the second foam walls FW typically has a thickness of between 2 inches and 2⅝ inches. As is conventional in the art, a plurality of lateral supports S (only diagrammatically shown) interconnect and couple the inwardly facing surface of the first foam wall FW to the inwardly facing surface of the second foam wall FW at a plurality of different locations in order to provide structural integrity thereto. These lateral supports S constantly maintain the spacing of the first foam wall FW from the second foam wall FW during shipment, installation, and use of the ICF foam block B as well as during filling of the interior compartment of the ICF foam blocks B with concrete C. The lateral supports S, of the ICF foam blocks B, can also assist with supporting electrical conduit 58, discussed below in further detail, before the concrete is poured inside to the interior compartment defined by the ICF foam blocks B. As such laterals supports S are conventional and well known in the ICF foam block art, a further detailed discussion concerning the same is not provided.

As generally shown in FIG. 21, a plurality of the ICF foam block B are stacked end to end and one on top of the other, in a conventional manner, to form a desired hollow wall. As shown in FIG. 21, each horizontal row of the plurality of ICF foam blocks B are stacked, in a partially overlapped fashion, on top of one another. Once a desired portion of the wall W is erected, the next step is to install the desired electrical outlet(s), electrical switch(es), etc., at the desired locations in the assembled wall W prior to completing assembly of the wall W and filling internal compartment, of the plurality of the ICF foam blocks B, with concrete C. In order to accomplish this, the user will then mark each desired location where an electrical outlet, an electrical switch, etc., is to be installed on the assembled wall W.

Once each one of the desired locations is suitably marked on the necessary ICF foam block(s) B of the assembled wall, the user will then cut a through hole 52 (see FIG. 24) at the marked location(s) in the respective ICF foam block B. The through hole 52 extends completely through the foam wall FW, at each marked location, in order to provide access to the interior compartment 54 formed between the mating first and second foam walls FW of the ICF foam block(s) B. The size and shape of the through hole 52 is slightly larger, e.g., a few thousands of an inch or so, than the area defined by the spacing of the first pair of sidewalls and the second pair of sidewalls 10 of the leading front end of the female component 4. As a result such close tolerance, the leading end of the female component 4 will have a fairly tight clearance fit with the through hole 52 formed in the foam wall FW, following installation of the female and male components 4, 6, as discussed below in further detail.

Figure 26:
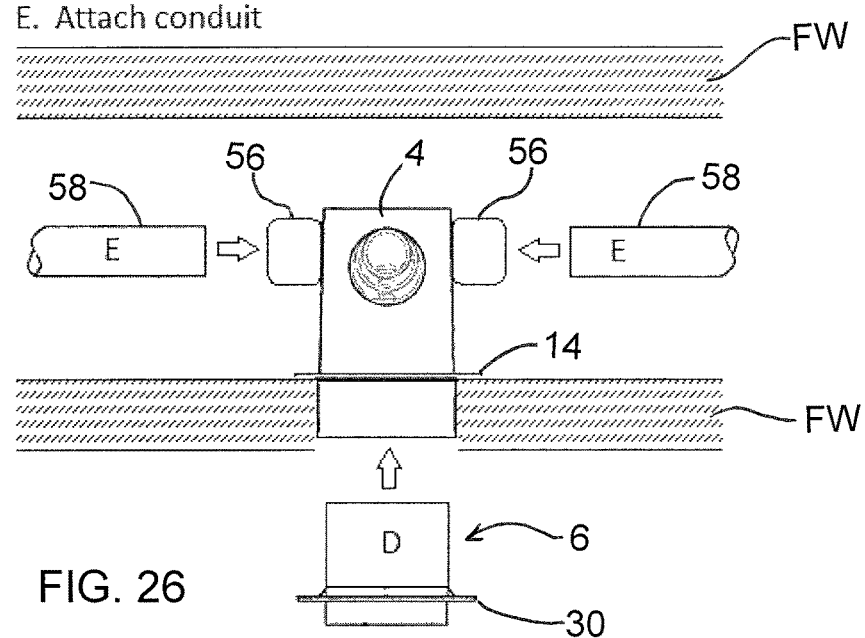
FIG. 26 is a diagrammatic top plan view of the ICF foam block showing the front of the female component fully engaged with the through hole and the male component of the improved electrical box being aligned for engagement with the female component to sandwich and captively retain the foam wall between the mating flanges and a pair of conduits which are to be coupled to the female component of the improved electrical box.

As shown in FIG. 25, the leading front end of the female component 4 is inserted into the through hole 52, from inside the interior compartment 54, until the female flange 14 abuts against the inwardly facing surface of the first foam wall FW, as generally shown in FIG. 26. Prior to installing the female component 4, typically one or more of the knockouts 16, e.g., a pair of knockouts in this instance, are removed from the sidewall of the female component 4, and conventional first and second coupling members 56 are connected to the female component 4 in a conventional manner. Thereafter, the leading rear end 34 of the male component 6 is inserted into the same through hole 52, from the opposite side of the foam wall FW, until the at least one locking tooth 34 of the male component 6 engages with one of the plurality of equally and sequentially arranged spaced teeth 18 of the female component 4. As the male component 6 is received by and moves relative to the female component 4, the female flange 14 and the male flange 30 gradually move toward one another and sandwich and captively retain the first foam wall FW therebetween. At the same time, the lateral rails 20, 22 are received and guide by the lateral slots 36, 38 to assist with relative movement between the male component 6 and the female component 4 as the at least one locking tooth 34 of the male component 6 sequentially engages with the spaced apart teeth 18 of the female component 4.

Figure 28:
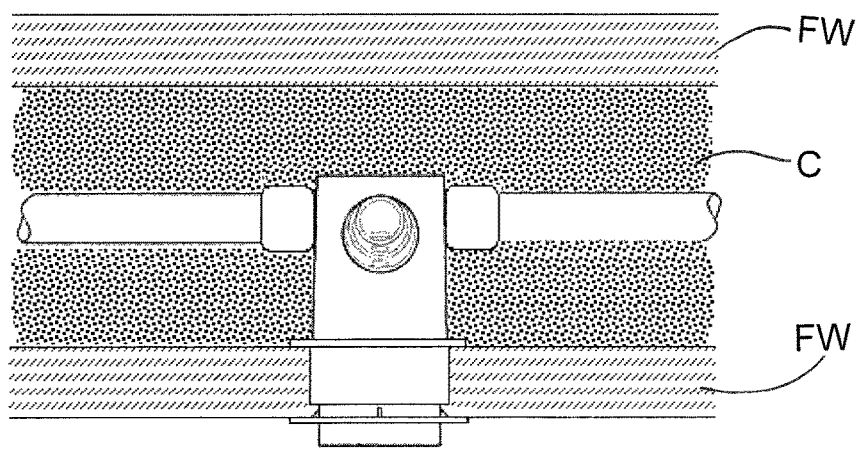
FIG. 28 is a diagrammatic top plan view of the assembled male and female components and the conduits after the concrete is poured into for filling the empty voids which are accommodated between the two side foam walls of the ICF foam blocks.
Figure 27:
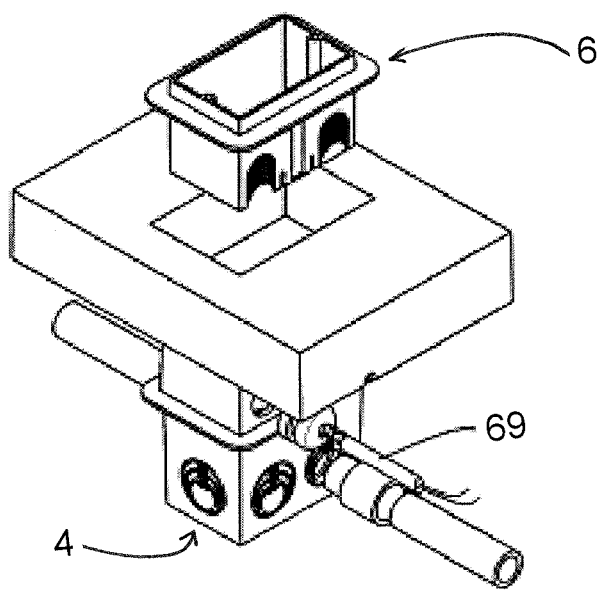
FIG. 27 is a diagrammatic perspective view, following assembly of the male component with the female component and the foam wall being sandwiched and captively retained between the mating flanges of the male component with the female component.
Figure 31C:
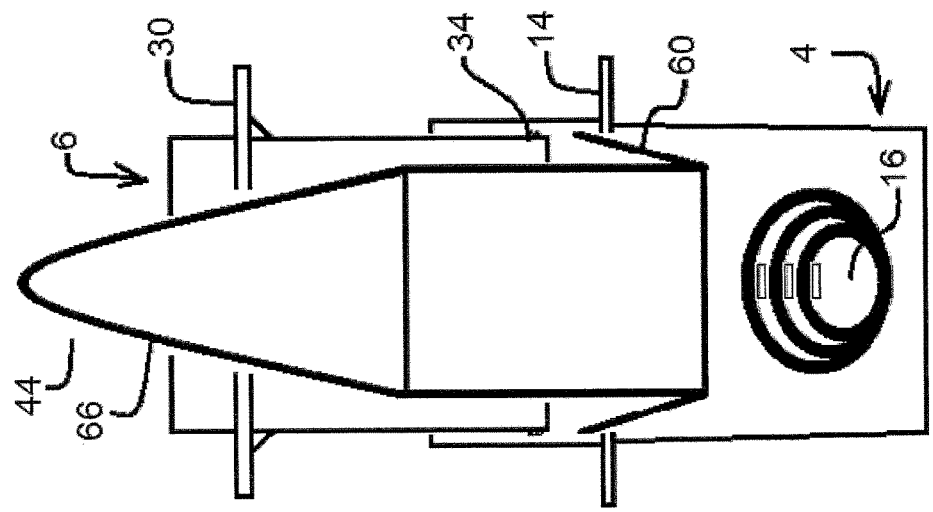
FIG. 31C shows a diagrammatic cross sectional side view of the removal tool of FIG. 31A engaging with the male component to facilitate disengagement of the male component from the female component and removal of the male component from the female component.
Figure 31B:
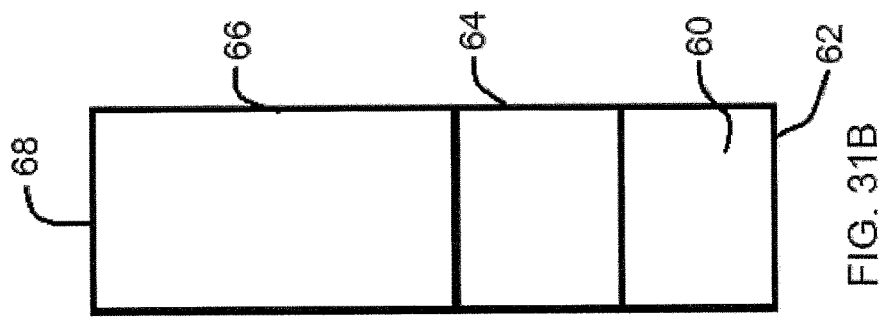
FIG. 31B shows a diagrammatic front view of the embodiment of the removal tool of FIG. 31A.
Figure 31A:
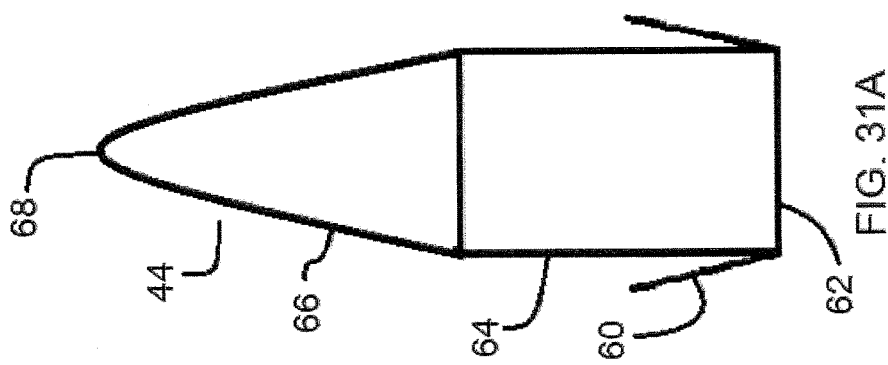
FIG. 31A shows a diagrammatic side view of one embodiment of the removal tool for the improved electrical box of the present invention.

Relative axial movement, between the male component 6 and the female component 4, continues until the male flange 30 abuts against the exterior outwardly facing surface of the first foam wall FW and the female flange 14 abuts against the interior inwardly facing surface of the first foam wall FW. Once this occurs, the female flange 14 and the male flange 30 sandwich and captively retain the first foam wall FW therebetween, as generally shown in FIGS. 27 and 28. It is to be appreciated that the at least one locking tooth 34 of the male component 6 sequentially steps over or skips along the plurality of equally spaced teeth 18 of the female component 4, as the male component 6 moves axially relative to the female component 4, until the female flange 14 and male flange 30 sufficiently sandwich and captively retained the first foam wall FW therebetween, as generally shown in FIG. 28. It is to be appreciated that the mating teeth 18, 34, of the male component 6 and the female component 4, are designed and arranged only to permit further insertion of the male component 6 into the female component 4, but not permit withdrawal or removal, e.g., relative axial movement in the opposite direction, of the male component 6 from the female component 4. That is, such axial movement can only occur if the tool 44 (as shown in FIGS. 31A-31C) is utilized to pull or draw the locking teeth 34 of the male component 6 toward one another and out of engagement with the plurality of equally spaced teeth 18 of the female component 4.

As the relative axial movement occurs between the female component 4 and the male component 6, the surface of the at least one locking tooth 34 of the male component 6 which extends normal to the sidewall 28 of the male component 6 releases its engagement with the surface of one the plurality of equally spaced teeth 18 of the female component 4 which extends normal to the sidewall of the female component 4, as shown in FIG. 15C, the at least one locking tooth 34 of the male component 6 rides along an inclined surface of the next adjacent tooth. As this occurs, the opposed sidewall of the male component 6 are slightly biased toward one another until the normal surface 40 of the at least one locking tooth 34 of the male component 6 engages with the normal surface 42 of the next adjacent tooth of the plurality of equally spaced teeth 18 of the female component 4. This process is repeated until no further relative movement can occur between the male component 6 and the female component 4. Thereafter, the engagement between the normal surface 40 of the at least one locking tooth 34 of the male component 6 and the normal surface 42 of one the plurality of equally spaced teeth 18 of the female component 4 retains this relative position of the male component 6 and the female component 4 with the first foam wall FW sandwiched and captively retained between the female flange 14 and the male flange 30.

As generally shown in FIGS. 26 and 27, the desired conduit 58 is then connected or coupled, in a conventional manner, to the coupling members 56 which were previously connected to the female component 4. Both the conduit 58 and the coupling members 56 are hollow so that, when connected to the female component 4, the conduit 58 and the coupling members 56 facilitate "drawing" or pulling conventional electrical wiring therethrough to each one of the installed improved electrical boxes 2. This procedure of installing the improved electrical boxes 2 and associated conduit 58 within a wall fabricated from the plurality of ICF foam blocks B generally streamlines the process of running electrical wiring throughout a building since a bulk of the associated labor can be completed by lower priced laborers, rather than higher priced electricians. As a result of this, the associated manufacturing costs are significantly decreased.

Figure 30C:
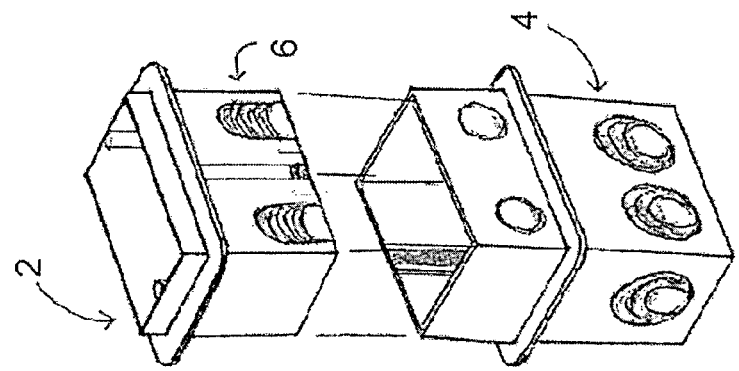
FIG. 30C is a diagrammatic front perspective showing alignment of the male component relative to the female component during assembly of the male and female components with one another according to a single-wide first embodiment of the improved electrical box of the present invention.
Figure 30B:
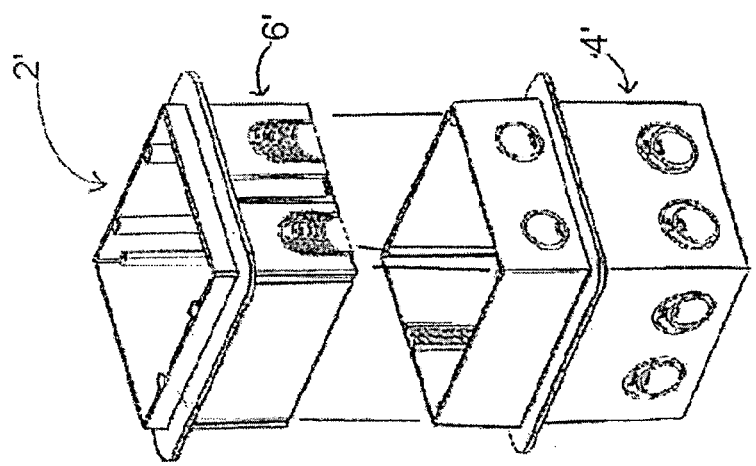
FIG. 30B is a diagrammatic front perspective showing alignment of the male component relative to the female component during assembly of the male and female components with one another according to a double-wide second embodiment of the improved electrical box of the present invention.

As is conventional in the art, for some applications, the width of the improved electrical box 2' can be doubled in sized so as to accommodate two electrical devices within the same electrical box 2' in a side by side arrangement with one, as generally shown in FIG. 30B. As this second embodiment is very similar to the previously discussed first embodiment, only the differences between the second embodiment and the first embodiment will be discussed in detail while identical elements will be given identical reference numerals.

The major difference between the second embodiment and the first embodiment is the overall width, of each of the female component 4' and the male component 6', is increased. That is, the width of each of the female component 4' and the male component 6' is double in size so as to accommodate both first and second electrical devices D in a side by side relationship. In all other respects, the second embodiment substantially identical to the first embodiment. As such "double wide" electrical boxes 2' are conventional and well known in the art, a further detailed discussion concerning the same is not provided. It is to be appreciated, however, that the above discussion concerning the single wide electrical box 2 is also generally applicable to double wide electrical boxes 2'.

Figure 30A:
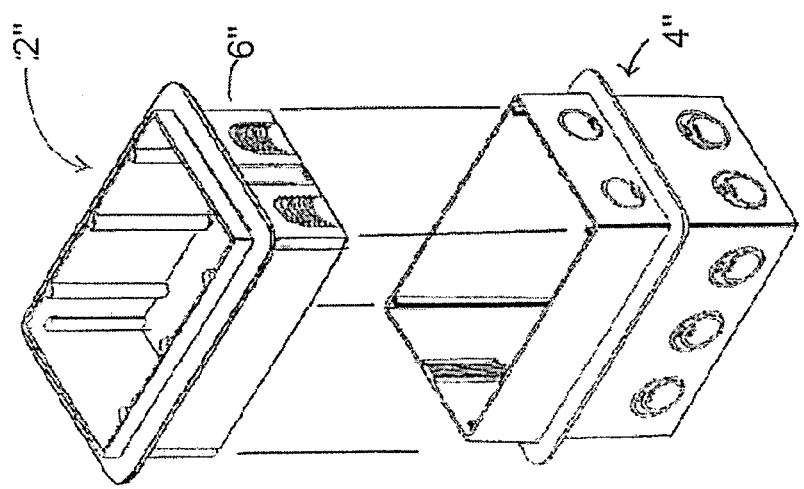
FIG. 30A is a diagrammatic front perspective showing alignment of the male component relative to the female component during assembly of the male and female components with one another according to a triple-wide third embodiment of the improved electrical box of the present invention.

As is conventional in the art, for some applications, the width of the improved electrical box 2" may be tripled in sized so as to accommodate three electrical devices within the same electrical box 2" in a side by side arrangement, as generally shown in FIG. 30A. As this third embodiment is very similar to the previously discussed first embodiment, only the differences between the third embodiment and the first embodiment will be discussed in detail while identical elements will be given identical reference numerals.

The major difference between the third embodiment and the first embodiment is the overall width, of each of the female component 4" and the male component 6", is increased. That is, the width of each of the female component 4" and the male component 6" is tripled in size so as to accommodate first, second and third electrical devices in a side by side relationship with one another. In all other respects, the third embodiment substantially identical to the first embodiment. As such "triple wide" electrical boxes 2" are conventional and well known in the art, a further detailed discussion concerning the same is not provided. It is to be appreciated, however, that the above discussion concerning the single wide electrical box 2 is also generally applicable to triple wide electrical boxes 2".

Referring to FIGS. 31A-31C, one embodiment of a removal tool 44, which facilitates disengagement of the male component 6 from the female component 4, is shown. More specifically, FIG. 31A shows a diagrammatic side view of one embodiment of the removal tool 44 for the improved electrical box of the present invention; FIG. 31B shows a diagrammatic front view of the embodiment of the removal tool 44 of FIG. 31A; and FIG. 31C shows a diagrammatic cross sectional side view of the removal tool of FIG. 31A engaging with the male component 6 to facilitate disengagement of the male component 6 from the female component 4 and removal of the male component 6 from the female component 4.

Referring now to FIG. 31A, the removal tool 44 has a first leading end 62 and a second trailing end 68 and includes a main body 64. Each one of a pair of respective tabs 60 is fixedly supported at or adjacent the leading end 62 of the main body 64. Each of the tabs 60 extends away from the leading end 62 of the main body 64 at a desired an angle, e.g., typically less than 15 degrees, so that each of tabs 60 are each compressible toward and against the main body 64 of the removal tool 44 as the leading end 62 of the removal tool 44 is inserted, as shown in FIG. 31C, through the open end of the male component 6 of an assembled electrical box 2.

Once the removal tool 44 is sufficiently inserted into the assembled electrical box 2 so that the tabs 60 pass completely through the male component 6, the tabs 60 then expand slightly and thereafter engage with an inwardly facing surface of the female component 4 and further insertion of the removal tool 44, into the assembled electrical box 2, is discontinued by the user. Next, the removal tool 44 is moved in the opposite direction commencing partial removal of the removal tool 44 from the assembled electrical box 2. During such withdrawing motion, the free end of the tabs 60 become lodged between the male component 6 and the female component 4 and biases the opposed sidewalls of the male component 6 slightly toward one another. As the opposed sidewalls of the male component 6 are slightly biased toward one another, such biasing action pulls the locking teeth 34, of the male component 6, out of engagement with the plurality of equally spaced teeth 18, of the female component 4. Once the locking teeth 34 are completely disengaged from the equally spaced teeth 18, relative movement the male component 6 from the female component 4, in the withdrawing direction, is now permitted so as to facilitate complete removal of the male component 6 from the female component 4. It is understood that the precise angle at which the tabs 60 protrude away from the main body 64 is not critical so long as the functionality and compressibility of the tabs 60 is retained.

Referring to FIG. 31B, in certain embodiments, the tabs 60 are dimensioned to be about 1 inch long and about 1 inch wide. The main body 64 may be dimensioned to be about half the overall length of the removal tool 44. In some cases, the trailing second end 68 of the removal tool 44 is tapered along a portion of the trailing body 66 to facilitate grasping and handling by a user when inserting and withdrawing the removal tool 44 from the electrical box 2 (as show in FIG. 31C).

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Wherefore, I claim:

1. An electrical box assembly, for assembly with an insulated concrete form (ICF) foam block, comprising:
   a female component of the electrical box assembly having a plurality of side walls, being open at a front end thereof, and an exterior surface of the female component supporting a female flange;
   a male component of the electrical box assembly having a plurality of side walls equal to the number of side walls present in the female component, being open at both opposed front and rear ends thereof, and an exterior surface of the male component supporting a male flange;
   a first locking mechanism being supported by the female component having a first pair of rails with a plurality of teeth located between the first pair of rails and a mating second locking mechanism having a second pair of rails with a plurality of teeth located between the second pair of rails being supported by the male component; and
   the male component being received within the open end of the female component and the first and second locking mechanisms facilitating relative receiving movement of the male component within the female component until the male flange and the female flange retain the insulated concrete form (ICF) foam block therebetween, and the first and second locking mechanisms facilitates retaining a relative position of the male and the female components of the electrical box assembly such that the insulated concrete form (ICF) foam block is sandwiched between the male and the female flanges.

2. The electrical box assembly according to claim 1, further comprising wherein the female component has an at least partially closed rear wall.

3. The electrical box assembly according to claim 2, wherein the sidewalls and rear wall of the female component have a plurality of knockouts which are selectively removable to provide access to an interior space defined by the female component; and
   at least one of the said sidewalls of the male component has at least one set of gradient knockouts which are removable to provide access to an interior space defined by the said sidewalls of the male component.

4. The electrical box assembly according to claim 3, wherein a thinned area of the sidewalls of the female component defines the plurality of knockouts while a thinned area of the sidewalls of the male component defines the at least one set of said gradient knockouts.

5. The electrical box assembly according to claim 2, wherein the female component has a width of between about 2 inches and about 6 inches, and a height of between about 3.5 inches and about 4.0 inches; and
   the male component has a length of between about 1.5 inches and about 3.0 inches, a width of between about 1.75 inches and about 5.5 inches, and a height of between about 3.5 inches and about 4.0 inches.

6. The electrical box assembly according to claim 5, wherein each of the female and male components have a width which can accommodate two electrical devices, in a side by side relationship with respect to one another.

7. The electrical box assembly according to claim 5, wherein each of the female and male components have a width which can accommodate three electrical devices, in a side by side relationship with respect to one another.

8. The electrical box assembly according to claim 1, wherein the female flange extends around an entire perimeter of the exterior of the sidewalls of the female component, adjacent to but spaced from the open front end of the female component, and the male flange extends around an entire perimeter of the male component, closely adjacent the open front end of the male component.

9. The electrical box assembly according to claim 1, wherein the female flange is spaced between 0.5 inches and about 2.5 inches from a front edge of the female component and the male flange is spaced between 0.625 inches and about 0.125 inches from a front edge of the male component.

10. The electrical box assembly according to claim 1, wherein at least one of the said sidewalls of the female component has at least one knockout which is removable to provide access to an interior space defined by the female component.

11. The electrical box assembly according to claim 1, wherein at least one knockout, which is removable to provide access to an interior space defined by the said sidewalls of the female component, is provided in one of the said sidewalls on each side of the female flange.

12. The electrical box assembly according to claim 1, wherein at least one of the said sidewalls of the male component has at least one set of gradient knockouts which are removable to provide access to an interior space defined by the male component.

13. The electrical box assembly according to claim 12, wherein the at least one set of said gradient knockouts are formed in a surface of the said sidewalls of the male component adjacent a rear end of the male component.

14. The electrical box assembly according to claim 1, wherein each of the female component and the plurality of sidewalls of the male component has a sidewall thickness of about 0.079 inches (2 mm).

15. The electrical box assembly according to claim 1, wherein both the female flange and the male flange have a sufficient height and a sufficient thickness to securely engage and retain the insulated concrete form (ICF) foam block therebetween.

16. The electrical box assembly according to claim 1, wherein a removal tool facilitates separating the male component from the female component, the removal tool comprises a main body supporting a pair of tabs adjacent a free leading end thereof which are compressible toward the main body, and the tabs facilitate disengaging the second locking mechanism, supported by the male component, from the first locking mechanism, supported by the female component, to facilitate complete removal of the male component from the female component.

17. A method of installing of an electrical box assembly in a through hole cut through a foam wall of an insulated concrete form (ICF) foam block, the method comprising:
providing a female component of the electrical box assembly having a plurality of side walls, which is open at a front end thereof, and supporting a female flange on an exterior surface of the female component;
providing a male component of the electrical box assembly having a plurality of side walls equal to the number of side walls present in the female component which is open at at least a front end thereof, and supporting a male flange on an exterior surface of the male component;
supporting a first locking mechanism on the female component having a first pair of rails with a plurality of teeth located between the first pair of rails and supporting a mating second locking mechanism on the male component having a second pair of rails with a plurality of teeth located between the second pair of rails;
inserting the open end of the female component into the through hole of the insulated concrete form (ICF) foam block until the female flange abuts against the foam wall;
inserting a rear end of the female component into the through hole, from an opposite side of the insulated concrete form (ICF) foam block, and into the open end of the female component;
permitting relative movement, via the first and second locking mechanisms, as the male component is received by the female component until the male flange and the female flange sandwich the foam wall of the insulated concrete form (ICF) foam block therebetween; and
retaining relative positions of the male and the female components with respect to one another, via the first and second locking mechanisms, so that the foam wall is retained between the male and the female flanges.

18. The method of removing of an electrical box assembly in a through hole cut through a foam wall of an insulated concrete form (ICF) foam block according to claim 17, the method comprising:
providing a removal tool having a pair of tabs protruding away from a main body of the removal tool; and inserting the removal tool into the open end of the male component; separating the male component supporting the first locking mechanism on the male component from the female component supporting the mating second locking mechanism on the female component; and pulling the second locking mechanism out of engagement with the first locking mechanism of the female component to facilitate removal of the male component from the female component of the electrical box assembly.

* * * * *